(12) United States Patent
Budiu

(10) Patent No.: US 8,928,663 B2
(45) Date of Patent: Jan. 6, 2015

(54) VISUALIZING CORRELATIONS IN MULTI-DIMENSIONAL DATA

(75) Inventor: Mihai Budiu, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 12/705,633

(22) Filed: Feb. 15, 2010

(65) Prior Publication Data

US 2011/0199380 A1  Aug. 18, 2011

(51) Int. Cl.
*G06T 11/20* (2006.01)
*G06F 17/30* (2006.01)

(52) U.S. Cl.
CPC ........ *G06F 17/30601* (2013.01); *G06T 11/206* (2013.01)
USPC ........................................... 345/440; 345/630

(58) Field of Classification Search
None
See application file for complete search history.

(56) References Cited

U.S. PATENT DOCUMENTS

| | | | |
|---|---|---|---|
| 6,188,405 B1 | 2/2001 | Czerwinski et al. | |
| 6,529,217 B1 * | 3/2003 | Maguire et al. | 715/769 |
| 6,842,176 B2 | 1/2005 | Sang'udi et al. | |
| 6,995,768 B2 | 2/2006 | Jou et al. | |
| 7,071,940 B2 | 7/2006 | Malik | |
| 7,158,992 B2 | 1/2007 | Megiddo et al. | |
| 7,265,755 B2 | 9/2007 | Peterson | |
| 2004/0085316 A1 * | 5/2004 | Malik | 345/440 |
| 2005/0099423 A1 * | 5/2005 | Brauss | 345/440 |
| 2007/0082707 A1 | 4/2007 | Flynt et al. | |
| 2009/0006226 A1 * | 1/2009 | Crowder | 705/30 |

OTHER PUBLICATIONS

Kang, et al., "Visualization Methods for Personal Photo Collections: Browsing and Searching in the PhotoFinder", Retrieved at <<http://ieeexplore.ieee.org/stamp/stamp.jsp?tp=&arnumber=871061&isnumber=18858>>, Multimedia and Expo, ICME, IEEE International Conference on vol. 3, 2000, pp. 1539-1542.
Derthick, et al., "An Interactive Visualization Environment for Data Exploration", Retrieved at <<http://www.cs.cmu.edu/~sage/PDF/kdd97.pdf>>, Proceedings of Knowledge Discovery in Databases, AAAI Press, Aug. 1997, pp. 2-9.
Swayne, et al., "XGobi: Interactive Dynamic Data Visualization in the X Window System", Retrieved at <<http://stat.cmu.edu/general/XGobi/papers/xgobi98.ps.gz>>, Mar. 5, 1998, pp. 1-20.

* cited by examiner

*Primary Examiner* — David H Chu
(74) *Attorney, Agent, or Firm* — Micah Goldsmith; Leonard Smith; Micky Minhas

(57) ABSTRACT

A system for visualizing correlations between attributes in a data set or across multiple data sets is provided. A user may view a graphical representation (e.g., a histogram) of attribute values for a first attribute. The user may assign a variety of graphical indicators to various value ranges of the first attribute. The user may view a graphical representation of the second attributes. The user may "drag and drop" the graphical representation of the first attributes onto the graphical representation of the second attributes. The graphical representation of the second attributes may be updated to incorporate the graphical elements assigned by the user to the value ranges of the first attribute. The user may visually see potential correlations between the first and the second attributes based on the graphical elements associated with the first attributes displayed with the associated second attributes.

18 Claims, 11 Drawing Sheets

300

500

800

1100

VISUALIZING CORRELATIONS IN MULTI-DIMENSIONAL DATA

BACKGROUND

Analyzing data for correlations is a difficult and time consuming task. For example, a user may want to determine if the values of one field or attribute of a set of records is correlated with another value, field, or attribute of the record. Currently, a user may have a hunch or insight into a possible correlation between attribute pairs, and may then perform various calculations on the data set to determine if the attributes of the pair are indeed correlated.

This solution is problematic because users guess or speculate on possible correlations before performing the correlation calculations. Such calculations are time consuming and processor intensive, especially with data sets that often include thousands or even millions of records. Further, such problems are further exacerbated when attempting to determine correlations between attributes of different tables or data sets.

There are two potential limitations of standard statistical tests to discover correlations: (1) such tests usually employ a threshold value to ascertain correlation; results below the threshold are deemed uncorrelated, however, there is no automatic way of choosing the thresholds for all application domains; (2) the statistical tests may also fail to discover partial correlations (when only a subset of the records displays the correlation).

SUMMARY

A system for visualizing correlations between attributes in a data set or across multiple data sets is provided. A user may view a graphical representation of attribute values for a first attribute. The graphical representation may be a histogram and the user may assign a variety of graphical indicators such as colors to various value ranges of the first attribute. The user may then view a graphical representation of a second attribute. The user may then "drag and drop" the graphical representation of the first attribute onto the graphical representation of the second attribute. The graphical representation of the first attribute (the one being dragged) may be referred to as "the source" and the graphical representation of the second attribute (the one being dropped on) may be referred to as "the target". The graphical representation of the second attribute may then be updated to incorporate the graphical elements assigned by the user to the value ranges of the first attribute. The user may then visually see potential correlations between the first and the second attributes based on the graphical elements associated with the first attribute displayed within the graphical representation of the second attribute.

In an implementation, a data set is received. The data set may include a plurality of records and each record may include a first attribute and an associated second attribute and each attribute may have an associated attribute value. One or more classifications are received for the first attributes. Each of the first attributes may be associated with a classification based on the attribute value associated with the first attribute. Each of the classifications is assigned with a graphical element. A graphical representation of the first attributes is displayed according to the graphical element assigned to the classification associated with each of the first attributes. A graphical representation of the second attributes is displayed. An indication to display a further graphical representation of the second attributes according to the graphical elements assigned to the classifications associated with each of the first attributes is received. A further graphical representation of the second attributes is displayed. The further graphical representation may include the graphical elements assigned to the classifications of the first attributes associated with each second attribute.

Implementations may include some or all of the following features. The classifications may include ranges. Assigning each of the classifications with a graphical element may include assigning a color to each of the classifications. Assigning each of the classifications with a graphical element may include assigning a shading to each of the classifications. The first graphical representation may include a histogram. The indication to display a further graphical representation may be received as a result of a user dragging a representation of the graphical representation of the first attributes onto a representation of the graphical representation of the second attributes. The indication to display the further graphical representation may be received as a result of a user selecting a user interface element.

In an implementation, a first data set is received. The first data set may include a plurality of records and each record may include a first attribute and each first attribute may have an associated attribute value. A second data set is received. The second data set may include a plurality of records and each record may include a second attribute and each second attribute may have an associated attribute value. An association of the first data set with the second data set is received. One or more classifications for the first attributes are received. Each of the first attributes may be associated with a classification based on the attribute value associated with the first attribute. Each of the one or more classifications is assigned with a graphical element. A first graphical representation of the first attributes is displayed according to the graphical elements assigned to the classification associated with each of the first attributes. A second graphical representation of the second attributes is displayed. An indication to display a third graphical representation of the second attributes according to the graphical elements assigned to the classification associated with each of the first attributes is received. A third graphical representation of the second attributes is displayed. The third graphical representation includes the graphical elements assigned to the classifications of the first attributes according to the association of the first data set with the second data set.

Implementations may include some or all of the following features. A selection of a subset of the first graphical representation may be received. The subset may include one or more of the graphical elements. The third graphical representation may be displayed using only the graphical elements included in the subset. The association may be a one-to-many association or a one-to-one association.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
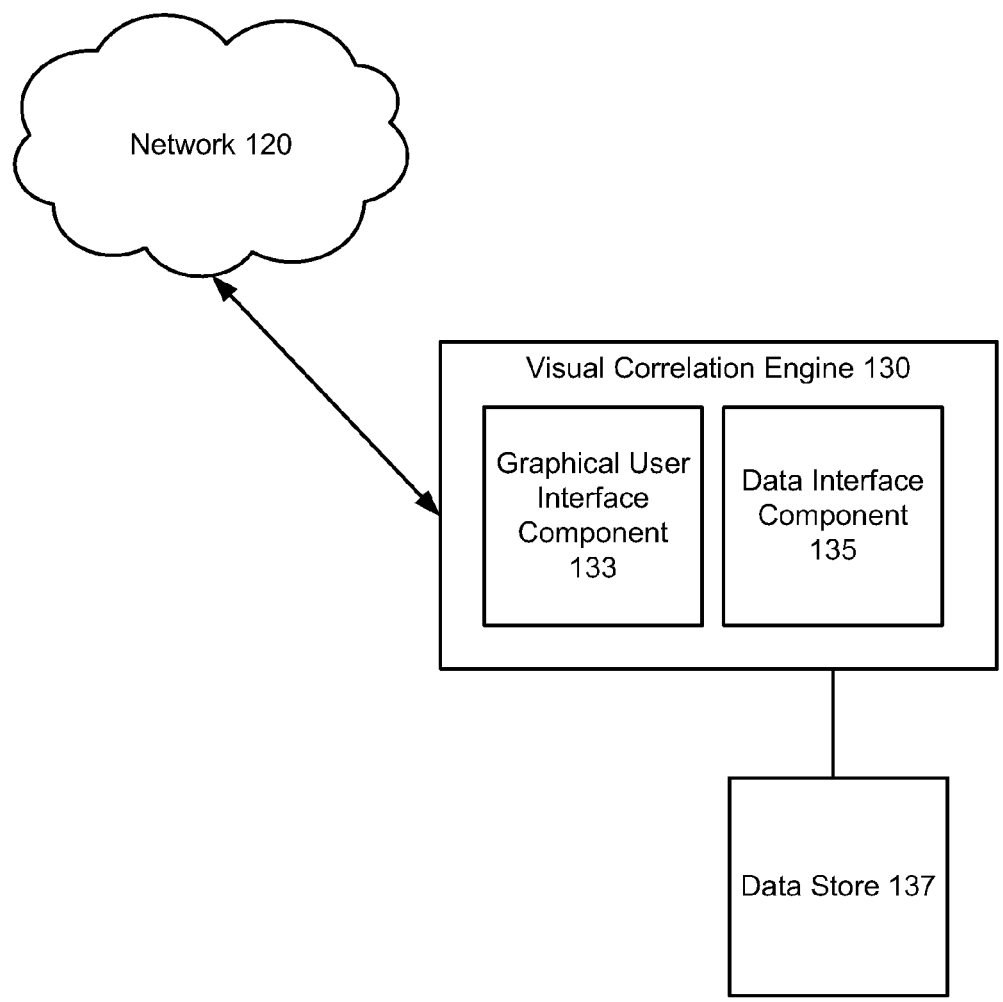
FIG. 1 is an illustration of an example environment for providing visual indications of correlations.

FIG. 1 is an illustration of an example environment 100 for providing visual indications of correlations. As illustrated, the environment 100 includes a visual correlation engine 130 connected to a network 120. The network 120 may be a variety of network types including the public switched telephone network (PSTN), a cellular telephone network, and a packet switched network (e.g., the Internet). The visual correlation engine 130 may be implemented using one or more general purpose computing devices such as the computing device 1100 illustrated with respect to FIG. 11, for example.

The visual correlation engine 130 may allow a user (or administrator) to visually observe possible correlations between attribute pairs from records of a data set (or multiple data sets) by displaying graphical indications associated with a first attribute of the attribute pair along side of, or within, graphical representations of a second attribute of the attribute pair. The graphical indications may allow a user to observe possible correlations between the attributes, without analyzing the data using computationally expensive computations. Based on the observed correlations or lack thereof, the user (or administrator) may then determine if a more computationally expensive correlation computation is warranted.

The visual correlation engine 130 may include a data interface component 135. The data interface component 135 may interface with or access one or more data sets stored at a data store 137. In some implementations, the data store 137 may be implemented using a variety of databases and/or data storage systems. For example, the data store 137 may be implemented using MICROSOFT ACCESS or any other commercially available database system. While the data store 137 is illustrated as being directly connected to the data interface component 135, it is contemplated that the data store 137 may also be connected to the data interface component 135 through the network 120.

The data sets stored at the data store 137 may include one or more tables. In some implementations, each table may include one or more records or data tuples. Each record may include one or more attributes, with each attribute having one or more possible attribute values. One or more attributes in a table may be referred to as a key attribute. Each key attribute in a table has a unique attribute value. Examples of key attributes may include a record identifier that uniquely identifies a record in the data set, and a social security number that unique identifies a record corresponding to a U.S. citizen in a database. Other keys may also be used.

For example, consider the sample records in Table 1 from an example data set corresponding to computer processes:

TABLE 1

| ID | Time | Disk Usage | Network Latency | Memory Usage |
|----|------|------------|-----------------|--------------|
| 1  | 50   | 60         | 78              | 5            |
| 2  | 250  | 70         | 65              | 7            |
| 3  | 5    | 4          | 76              | 13           |

The three example records listed in Table 1 represent records associated with computer processes. The records have five data attributes: ID, Time, Disk Usage, Network Latency, and Memory Usage. In the above example, the attribute ID is the key attribute because it uniquely identifies each record.

The data interface component 135 may further store or receive an association between two or more data sets from the data store 137. The association may an attribute value that links records of one or more data sets. For example, an attribute that includes social security numbers may link records in a health related database to records in a credit related database. The attributes of the two databases may then be correlated through the social security number attribute. In some implementations, the association may be a one-to-one association meaning that each record in a first data set has a single corresponding record in the second data set. In other implementations, the association may be a one-to-many association meaning that each record in a first data set has multiple corresponding records in the second data set. For example, a credit related table may have one entry for each social security number and a transaction related table may have many transactions associated with each social security number.

Figure 2:
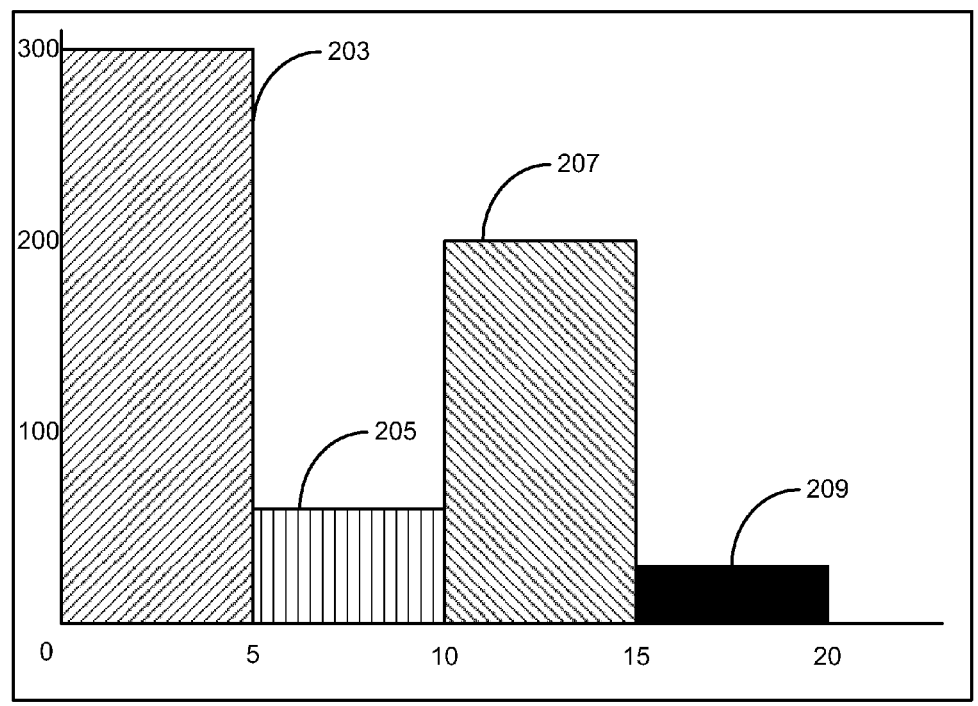
FIG. 2 is an illustration of an example graphical user interface used to display the values of the first attribute of the data.

The visual correlation engine 130 may further include a graphical user interface component 133. The graphical user interface component 133 may allow a user to view graphical representations of the data from the data store 137. For example, the graphical user interface 200 illustrated in FIG. 2 is such a graphical representation.

In some implementations, the graphical user interface component 133 may allow a user to select one or more attributes to view. For example, a user may use the graphical user interface component 133 to select the Memory Usage attribute. Some or all of the values associated with the Memory Usage attributes may be graphically displayed to the user. The values may be displayed by the graphical user interface component using a variety of graphing techniques and/or systems including histograms, scatter plots, pie charts, etc. The particular graphing system or technique used may be selected by the user, for example.

In some implementations, the graphical user interface component 133 may further allow the user to select or specify one or more classifications for a selected attribute. A classification may comprise a range of possible attribute values and is a way to organize and/or classify the attribute using the attribute values. For example, the graphical user interface 200 shows a histogram of the attribute Memory Usage. As illustrated, the x-axis of the histogram shows that the attribute values have been divided into four classifications: a first classification for Memory Usage attribute values falling between 0 and 5; a second classification for attribute values falling between 5 and 10; a third classification for values falling between 10 and 15; and a fourth classification for values falling between 15 and 20. While only four classifications are shown, it is for illustrative purposes only; there is no limit to the number of classifications that may be supported. The classifications may have been selected by the user or automatically selected by the graphical user interface component 133.

The y-axis of the histogram may indicate the number of records that have attribute values for the attribute Memory Usage that fall into the particular classifications. Thus, histogram bar 203 indicates that there are 300 records with an attribute value for the attribute Memory Usage that falls between 0 and 5, histogram bar 205 indicates that there are 50 records with an attribute value for the attribute Memory Usage that falls between 5 and 10, histogram bar 207 indicates that there are 200 records with an attribute value for the attribute Memory Usage that falls between 10 and 15, and histogram bar 209 indicates that there are 25 records with an attribute value for the attribute Memory Usage that falls between 15 and 20.

The graphical user interface component 133 may further allow a user to assign a graphical element to each of the one or more classifications. The graphical element may be a visual element and may allow the user to distinguish between the classifications. The graphical element may be a color or shading, for example. Other types of graphical elements may also be used. The graphical elements may be selected by the user or automatically assigned to each classification by the graphical user interface component 133. As illustrated, histogram bar 203 has been assigned an upward angled shading, histogram bar 205 has been assigned a vertical shading, histogram bar 207 has been assigned a downward angled shading, and histogram bar 209 has been assigned a solid shading. Other shadings may also be used. A mapping between the graphical elements and the record keys may be stored in a table associated with the displayed data. Each display of the data may have a different mapping of graphical elements to database records.

Figure 3:
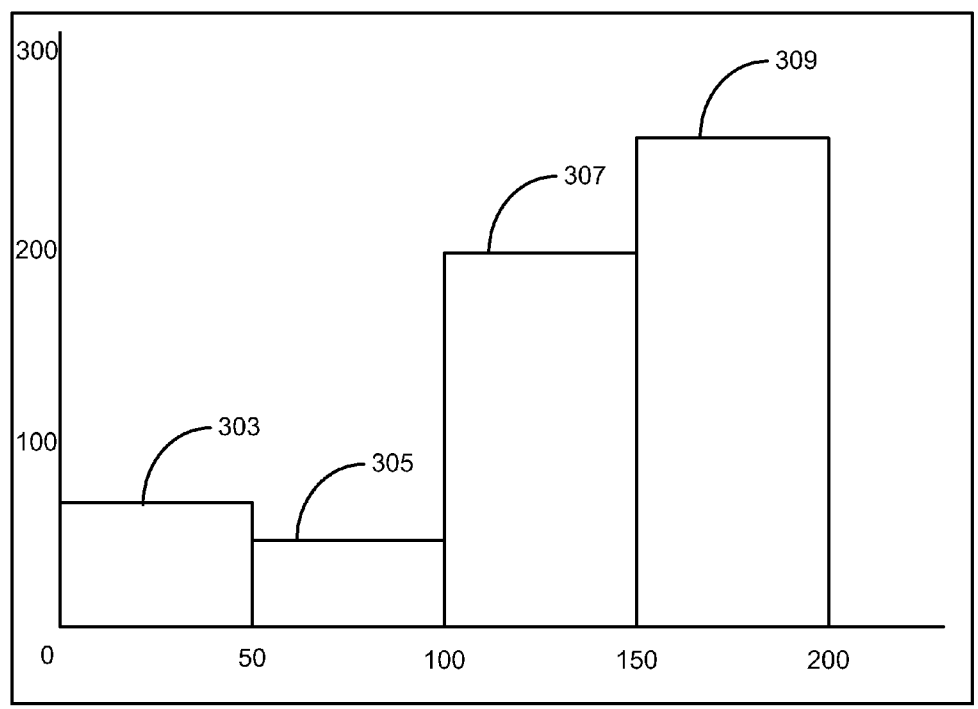
FIG. 3 is an illustration of another example graphical user interface used to display the values of the second attribute of the data.

The graphical user interface component 133 may further allow the user to select additional attributes to view graphical representations of. The additional attributes may be associated with the same data set (e.g., table) as the first attribute, or may be from a different data set or table. For example, FIG. 3 is an illustration of a graphical user interface 300 displaying a graphical representation of the attribute Time. Similarly to FIG. 2, the attribute values have been assigned to various classifications. As illustrated by histogram bar 303, there are 75 records that have the attribute Time with an attribute value between 0 and 50. As illustrated by histogram bar 305, there are 50 records that have the attribute Time with an attribute value between 50 and 100. As illustrated by histogram bar 307, there are 200 records that have the attribute Time with an attribute value between 100 and 150. As illustrated by histogram bar 309, there are 250 records that have the attribute Time with an attribute value between 150 and 200. While FIG. 3 is illustrated with no graphical elements assigned to the classifications, in some implementations, one or more graphical elements may be assigned to the classifications for the additional or second attributes.

The graphical user interface component 133 may further allow the user to view a graphical representation of a selected second attribute with the graphical elements associated with the classification of the original or first attribute. Such a view may allow the user to determine possible correlations between the first attribute and the selected additional attribute. In some implementations, the user may trigger such a view by "dragging and dropping" the graphical user interface 200 or a user interface element into the graphical user interface 300.

Figure 4:
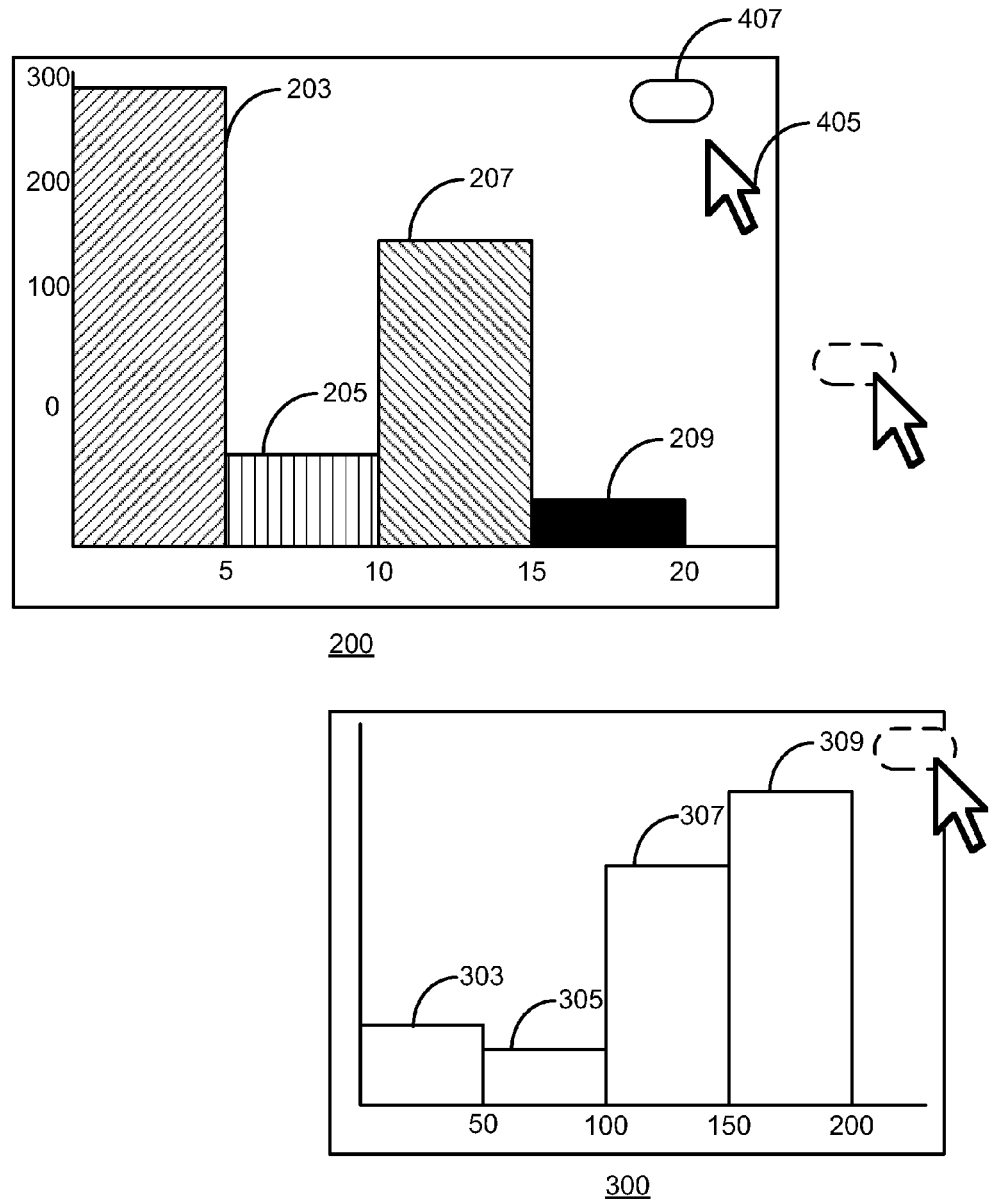
FIG. 4 is an illustration of an example operation for providing visual indications of correlations.

FIG. 4 is an illustration of a user performing such an operation. As shown, the user is selecting a user interface element 407 from the graphical user interface 200 ("the source") using a pointing tool 405. The user then drags the selected user interface element 407 onto the graphical user interface 300 ("the target") to indicate a desire to view a graphical representation of the selected second attribute with the graphical elements associated with the classification of the first attribute. As a result, the user interface 500 illustrated in FIG. 5 is generated.

Figure 5:
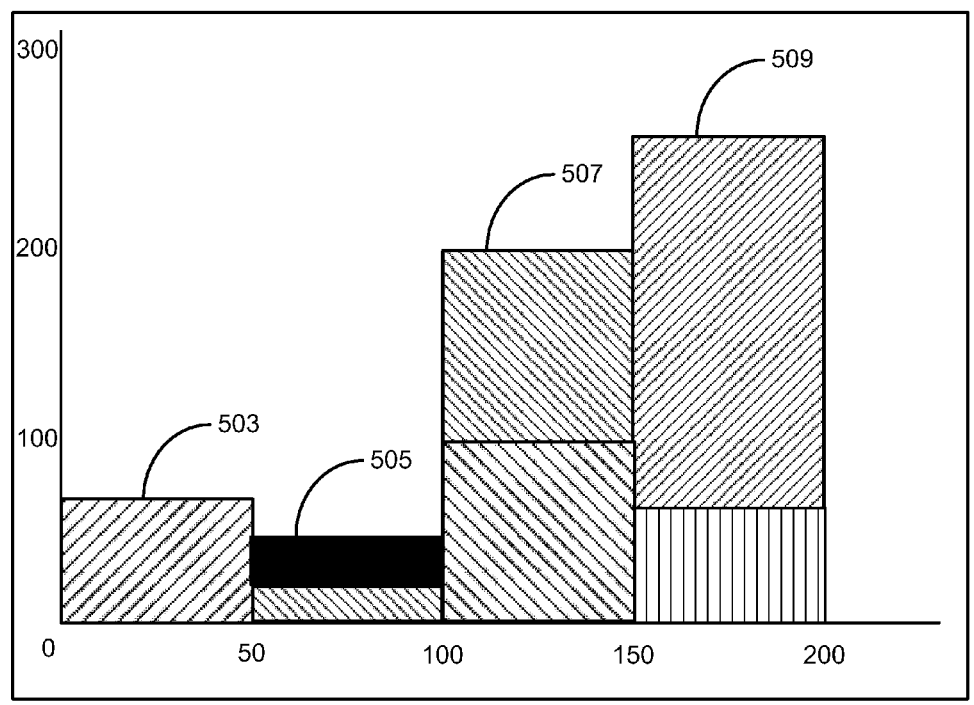
FIG. 5 is an illustration of another example graphical user interface for providing visual indications of correlations.

For example, the graphical user interface 500 of FIG. 5 shows histogram bars 503-509 corresponding to the histogram bars 303-309 of FIG. 3. The histogram bars 503-509 correspond to each of the unique classifications of the attribute Time from FIG. 3. In addition, the graphical elements of the classifications of the attribute Memory Usage have been displayed within the histogram bars 503-509. The graphical elements are displayed within the histogram bars 503-509 with sizes indicating their possible correlation between the Memory Usage attribute and the Time attribute.

The graphical elements associated with the classifications of the first attribute are displayed by the graphical user interface component 133 in the histogram bars of the classifications associated with the second attribute. As illustrated, the histogram bar 503 corresponding to attribute values of the attribute Time between 0 and 50 is displayed with the graphical element corresponding to values of the attribute Memory Usage between 10 and 15. This indicates that there are 75 records that have a value of the attribute Time that falls between 0 and 50 and have a value of the attribute Memory Usage that falls between 10 and 15.

The histogram bar 505 corresponding to values of the attribute Time between 50 and 100 is displayed with both the graphical element corresponding to values of the attribute Memory Usage between 10 and 15, and the graphical element corresponding to values of the attribute Memory Usage between 15 and 20. This indicates that there are 25 records that have a value of the attribute Time that falls between 50 and 100 and have a value of the attribute Memory Usage that falls between 10 and 15, and that there are 25 records that have a value of the attribute Time that falls between 50 and 100 and have a value of the attribute Memory Usage that falls between 15 and 20.

The histogram bar 507 corresponding to values of the attribute Time between 100 and 150 is displayed with both the graphical element corresponding to values of the attribute Memory Usage between 10 and 15, and the graphical element corresponding to values of the attribute Memory Usage between 0 and 5. This indicates that there are 100 records that have a value of the attribute Time that falls between 100 and 150 and have a value of the attribute Memory Usage that falls between 10 and 15, and that there are 100 records that have a value of the attribute Time that falls between 100 and 150 and have a value of the attribute Memory Usage that falls between 0 and 5.

The histogram bar 509 corresponding to values of the attribute Time between 150 and 200 is displayed with both the graphical element corresponding to values of the attribute Memory Usage between 5 and 10, and the graphical element corresponding to values of the attribute Memory Usage between 0 and 5. This indicates that there are 75 records that have a value of the attribute Time that falls between 150 and 200 and have a value of the attribute Memory Usage that falls between 5 and 10, and that there are 175 records that have a value of the attribute Time that falls between 150 and 200 and have a value of the attribute Memory Usage that falls between 0 and 5.

Thus, as can be appreciated by FIG. 5, the user can investigate possible correlations between the attributes based on the graphical elements associated with the classifications. For example, histogram bar 509 evidences a high percentage of records having both a low Memory Usage attribute value and a high Time attribute value, evidencing a possible correlation between low memory usage and high performance time for the processes. The user may then take additional steps to investigate the correlation based on the graphical evidence.

As illustrated in FIG. 4, graphical user interface component 133 may allow users to graphically discover correlations between data attributes by "dragging and dropping" a graphical representation of first data attributes or a user interface element onto a graphical representation of second data attributes. In addition, in some implementations, the user may use the graphical user interface component 133 to select a subset of the first attribute values and view correlations using the graphical elements associated with the selected subset of attribute values, rather than all of the graphical elements displayed.

Figure 6:
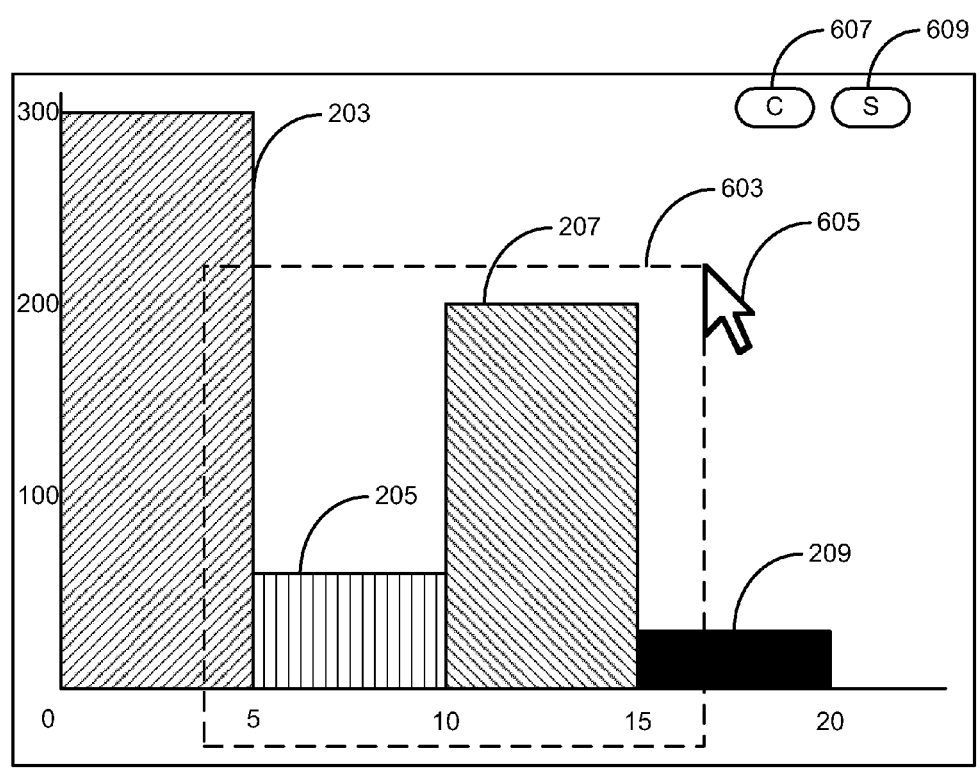
FIG. 6 is an illustration of another example graphical user interface for performing data selections.

For example, FIG. 6 is an illustration of a graphical user interface 600 where the user is selecting a subset of the attribute Memory Usage. As illustrated the user is selecting the subset by defining a region 603 with a pointing tool 605. The selected subset of the attribute may correspond to the attribute values that fall within the region 603. As illustrated, the user has selected the attribute values corresponding to the histogram bars 205 and 207. Any selection tools and/or user interface elements may be used to select the subset.

After selecting the subset of the attribute values, the user may "drag and drop" the selected subset onto a graphical representation of a different attribute. In some implementations, the user may "drag and drop" the selected subset by "dragging and dropping" one of the user interface elements 607 and 609. The user interface element 607 (e.g., identified with "C" to represent "colors", although any identifier or no identifier may be used) may signify a desire to only display in the target the graphical representation of the second attribute for the records that correspond to the selected records in the source, while the user interface element 609 (e.g., identified with "S" to represent "selection", although any identifier or no identifier may be used) may signify a desire to display in the target the graphical representation of the second attribute for all records (however, some records may have no correspondents in the source, and these may be indicated with a special or predetermined shading).

Figure 7:
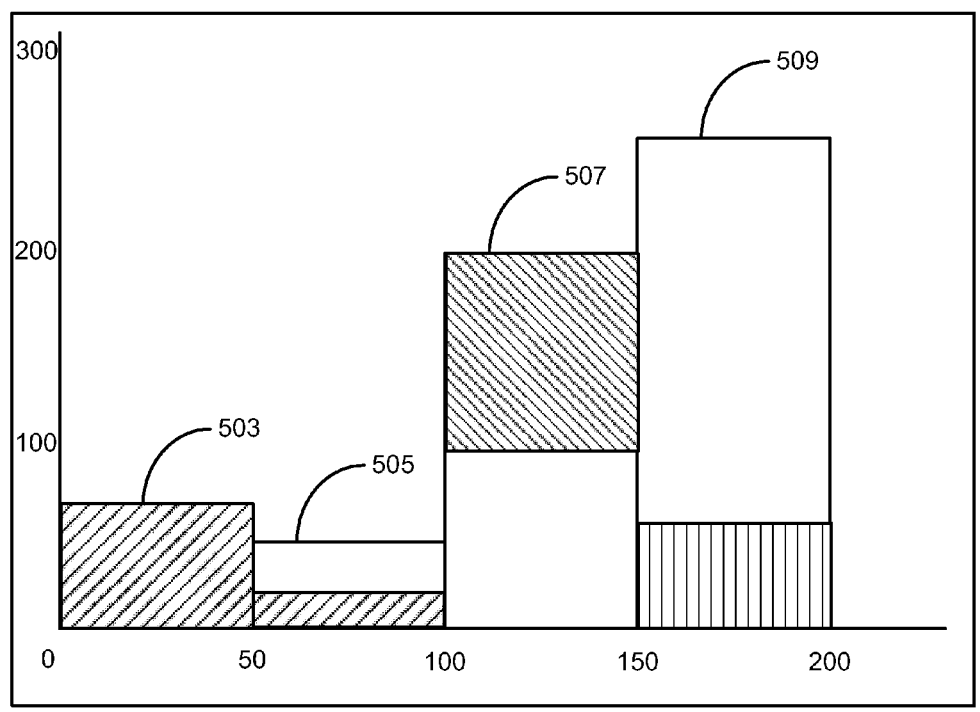
FIG. 7 is an illustration of another example graphical user interface for providing visual indications of correlations.

Continuing the example described previously, the user may drag a selected user interface element onto the graphical representation of the attribute Time. For example, the user may "drag and drop" a user interface element onto the graphical user interface 300 of FIG. 3. Accordingly, a new graphical representation of the second attribute is displayed by the graphical user interface component 133. An illustration of the result of "dragging and dropping" the user interface element 607 is illustrated in FIG. 7. An illustration of the result of "dragging and dropping" the user interface element 609 is illustrated in FIG. 8.

FIG. 7 is an illustration of a graphical user interface 700 that may be displayed in response to the user "dragging and dropping" the user interface element 607. As illustrated, the histogram bars 503-509 are shown with only the graphical elements that were captured by the region 603. For example, only the graphical elements associated with the histogram bars 205 and 207 are displayed in the histogram bars 503-509. Such a view may allow a user to refine or focus the particular classifications of an attribute that are used to visualize correlations. Note that second elements not associated with first elements are still shown as areas with no shading.

Figure 8:
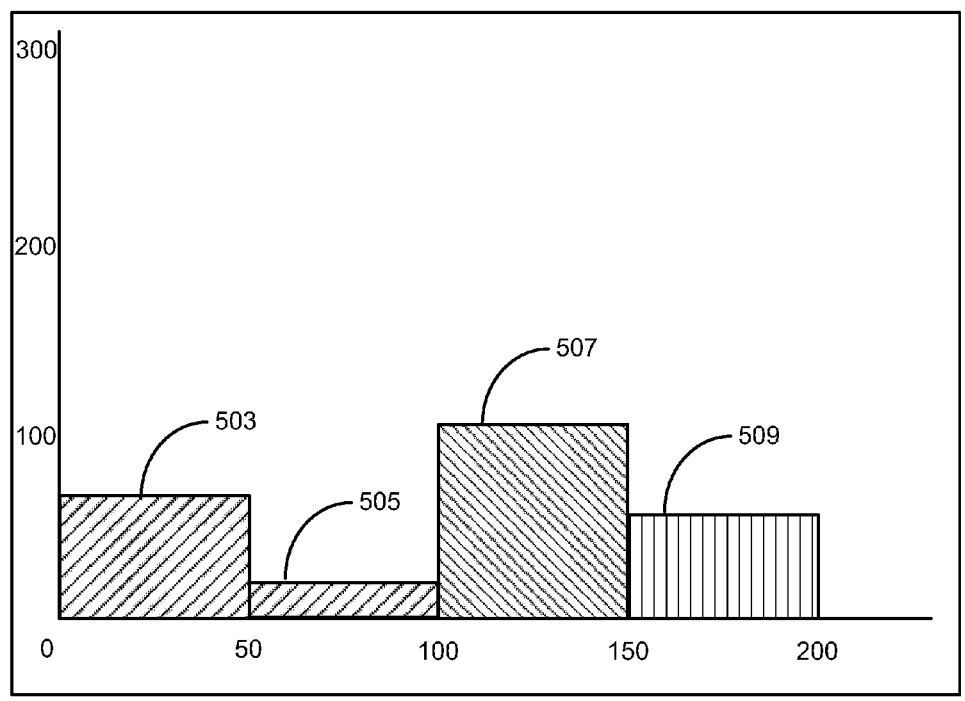
FIG. 8 is an illustration of another example graphical user interface for providing visual indications of correlations.

FIG. 8 is an illustration of a graphical user interface 800 that may be displayed in response to the user "dragging and dropping" the user interface element 609. As illustrated, the histogram bars 503-509 are shown with only the graphical elements that were captured by the region 603 and the histogram bars 503-509 have been adjusted to only display second attributes that were associated with first attributes captured by the region 603.

Figure 9:
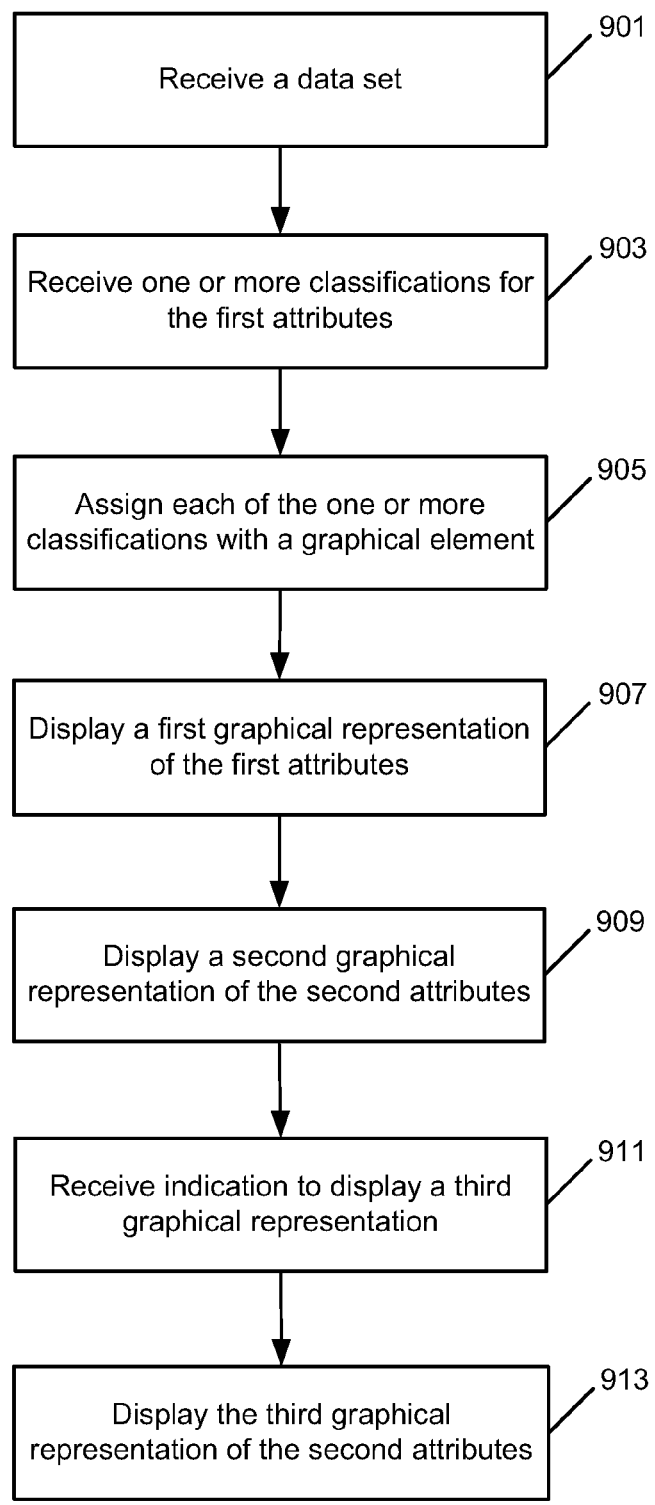
FIG. 9 is an operational flow of an implementation of a method for providing visual indications of correlations between attributes of a data set.

FIG. 9 is an operational flow of an implementation of a method 900 for providing visual indications of correlations between attributes of a data set. The method 900 may be implemented by the visual correlation engine 130 in an implementation.

A data set is received at 901. The data set may be received by the data interface component 135 of the visual correlation engine 130. The data set may include one or more records or tuples, and each record may include at least a first attribute and a second attribute. Each attribute may have one or more attribute values.

One or more classifications are received for the first attributes at 903. The one or more classifications may be received by the graphical user interface component 133 of the visual correlation engine 130. The classifications may correspond to ranges of attribute values. The classifications may be received from a user or may be automatically generated based on the attribute values of the first attributes. In some implementations, one or more classifications may also be received for the second attributes.

Each of the one or more classifications is assigned with a graphical element at 905. The one or more classifications may be assigned a graphical element by the graphical user interface component 133 of the visual correlation engine 130. The graphical elements may be automatically assigned or assigned based on selections received from a user. In some implementations, the graphical elements may be colors or shadings, for example. Other graphical elements may also be used.

A first graphical representation of the first attributes is displayed at 907. The first graphical representation may be displayed by the graphical user interface component 133 of the visual correlation engine 130. In some implementations, the first graphical representation may be a histogram with a histogram bar corresponding to each of the classifications. Each histogram bar may be displayed with the graphical element assigned to the corresponding classification. Other types of graphs or displays may be used. For example, the first graphical representation may be a scatter plot of the attribute values and each attribute value may be displayed using the graphical element assigned to its associated classification.

A second graphical representation of the second attributes is displayed at 909. The second graphical representation may be displayed by the graphical user interface component 133 of the visual correlation engine 130. The second graphical representation may be similar to the first graphical representation, but featuring the second attributes rather than the first attributes. The second graphical representation may be a histogram; however, other types of graphs or representations may be used.

An indication to display a third graphical representation is received at 911. The indication may be received from a user by the graphical user interface component 133 of the visual correlation engine 130. In some implementations, the indication may be the user "dragging and dropping" the first graphical representation or a user interface element onto the second graphical representation. In other implementations, the user may select a button or other user interface element to provide the indication.

The third graphical representation is displayed at 913. The third graphical representation may be displayed by the graphical user interface component 133 of the visual correlation engine 130. The third graphical representation may be of the second attributes, but may also include the graphical elements assigned to the classifications of the first attributes associated with each of the second attributes. By including the graphical elements assigned to the first attributes, the user may be made aware visually of possible correlations between the first attributes and the second attributes. For example, the graphical user interface 500 of FIG. 5 illustrates such a third graphical representation.

Figure 10:
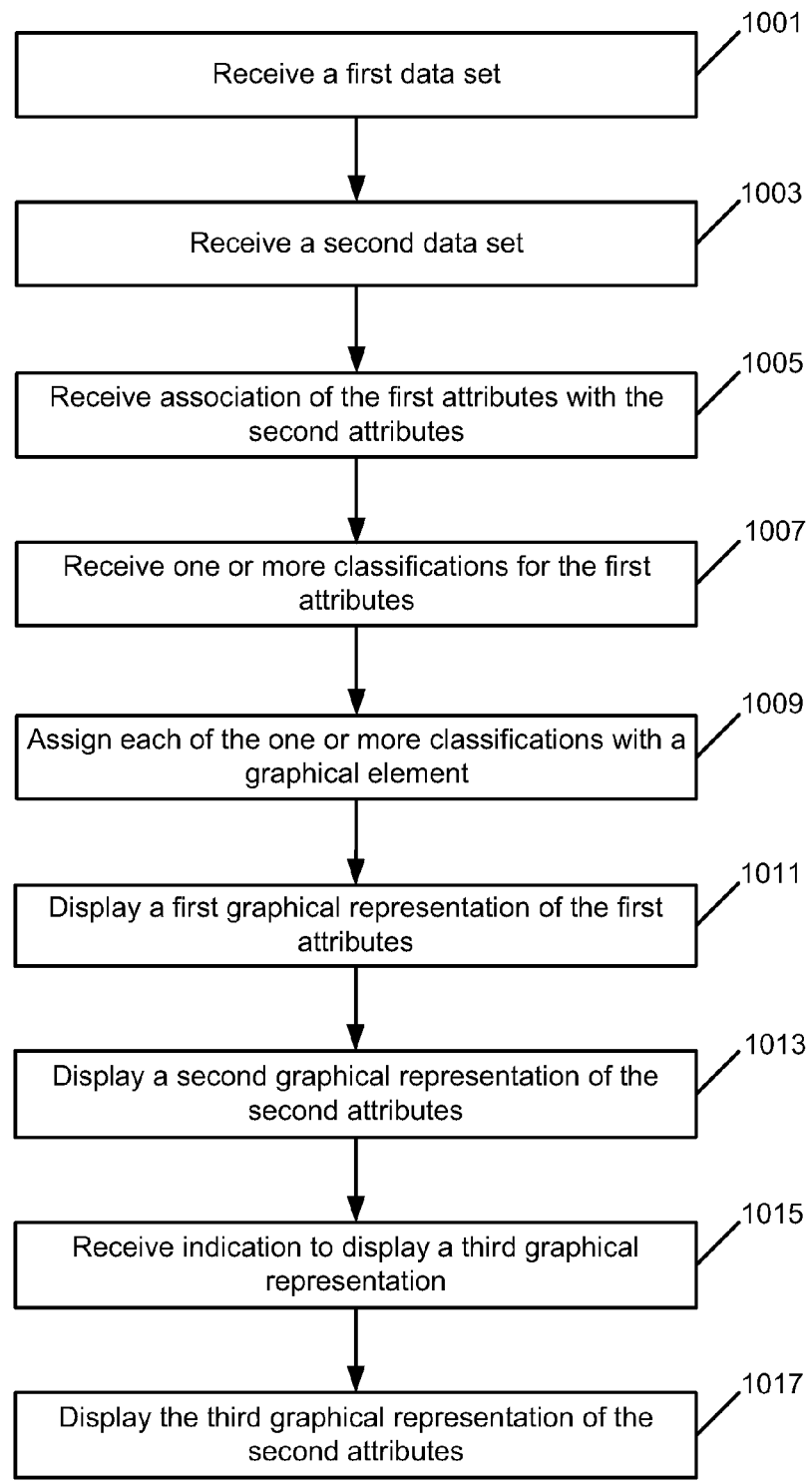
FIG. 10 is an operational flow of an implementation of a method for providing visual indications of correlations between attributes from different data sets.

FIG. 10 is an operational flow of an implementation of a method 1000 for providing visual indications of correlations between attributes of multiple data sets. The method 1000 may be implemented by the visual correlation engine 130.

A first data set is received at 1001. The first data set may be received by the data interface component 135 of the visual correlation engine 130. The first data set may include one or more records or tuples, and each record may include at least a first attribute.

A second data set is received at 1003. The second data set may be received by the data interface component 135 of the visual correlation engine 130. The second data set may include one or more records or tuples, and each record may include at least a second attribute.

An association between the first and second data sets is received at 1005. The association may be received by the data interface component 135 of the visual correlation engine 130. In some implementations, the association may be a link or relationship between the first and the second data sets such as a common attribute, or it may be a chain of such relationships (i.e., the mathematical composition of the relations). The association may be a one-to-one association or a one-to-many association. For example, the first and second data sets may share a common attribute such as social security number or telephone number.

One or more classifications are received for the first attributes at 1007. The one or more classifications may be received by the graphical user interface component 133 of the visual correlation engine 130. The classifications may correspond to ranges of attribute values. The classifications may be received from a user or may be automatically generated based on the attribute values of the first attributes. In some implementations, one or more classifications may also be received for the second attributes.

Each of the one or more classifications is assigned with a graphical element at 1009. The one or more classifications may be assigned a graphical element by the graphical user interface component 133 of the visual correlation engine 130. The graphical elements may be automatically assigned or assigned based on selections received from a user. In some implementations, the graphical elements may be colors or shadings, for example. Other graphical elements may be used in some implementations.

A first graphical representation of the first attributes is displayed at 1011. The first graphical representation may be displayed by the graphical user interface component 133 of the visual correlation engine 130. In some implementations, the first graphical representation may be a histogram with a histogram bar corresponding to each of the classifications.

A second graphical representation of the second attributes is displayed at 1013. The second graphical representation may be displayed by the graphical user interface component 133 of the visual correlation engine 130. The second graphical representation may be similar to the first graphical representation, but featuring the second attributes rather than the first attributes. The second graphical representation may be a histogram, although other types of graphs or representations may be used.

An indication to display a third graphical representation is received at 1015. The indication may be received from a user by the graphical user interface component 133 of the visual correlation engine 130. In some implementations, the indication may be the user "dragging and dropping" the first graphical representation or a user interface element onto the second graphical representation. In other implementations, the user may select a button or other user interface element to provide the indication.

The third graphical representation is displayed at 1017. The third graphical representation may be displayed by the by the graphical user interface component 133 of the visual correlation engine 130. The third graphical representation may be of the second attributes, but may also include the graphical elements assigned to the classifications of the first attributes associated with each of the second attributes. The third graphical representation may be generated by the graphical user interface component 133 using the association between the first and second data sets.

Figure 11:
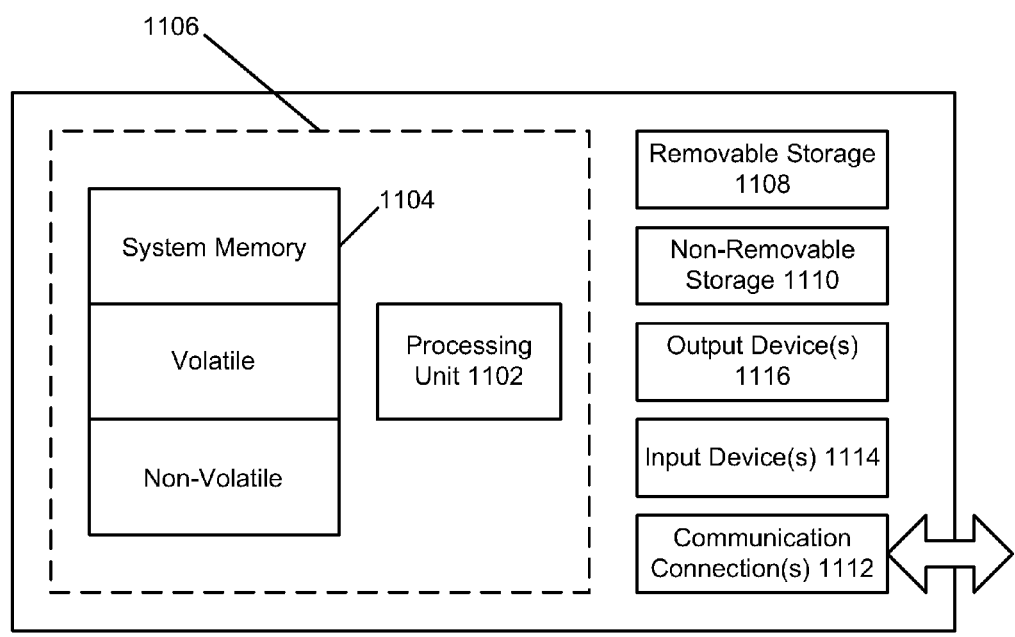
FIG. 11 is a block diagram of a computing system environment according to an implementation of the present system.

FIG. 11 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by device 1100 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communications connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:

receiving a data set at a computing device, the data set comprising a plurality of records, each record including at least a first attribute and a second attribute;

specifying a first set of classifications for the first attribute, each classification of the first set of classifications encompassing a first range of attribute values associated with the first attribute;

displaying a first graphical representation of the first attribute of the plurality of records, the first graphical representation comprising a first axis and a second axis, the first axis indicative of a number of records, and the second axis indicative of the first set of classifications;

specifying a second set of classifications for the second attribute, each classification of the second set of classifications encompassing a second range of attribute values associated with the second attribute, wherein the second range is different than the first range;

displaying a second graphical representation of the second attribute of the plurality of records, the second graphical representation comprising a third axis and a fourth axis, the third axis indicative of the number of records and the fourth axis indicative of the second set of classifications;

receiving an indication to display a third graphical representation indicative of a correlation between the first attribute and the second attribute of the plurality of records; and displaying the third graphical representation, the third graphical representation incorporating the first axis and the second axis, the third graphical representation combinedly displaying the first attribute and the second attribute of the plurality of records with respective sizes of overlapping portions of the first attribute and the second attribute indicating correlation between the first attribute and the second attribute with respect to each of the first set of classifications.

2. The method of claim 1, wherein specifying the first set of classifications comprises assigning at least one of a color or a shading to each of the classifications of the first set of classifications, and wherein the assigned at least one of a color or shading is displayed in the third graphical representation for allowing detection of possible correlations between the first and second attributes.

3. The method of claim 1, wherein the first graphical representation comprises one of a histogram, a scatter plot, or a pie chart.

4. The method of claim 1, wherein the indication to display a third graphical representation is received as a result of a user dragging a representation of the second graphical representation onto a representation of the first graphical representation.

5. The method of claim 1, wherein the indication to display a third graphical representation is received as a result of a user selecting a user interface element.

6. The method of claim 1, further comprising:

receiving user input comprising a selection of a subset of the first graphical representation, the subset including one or more of graphical elements; and displaying the third graphical representation using only the selected one or more graphical elements of the first graphical representation.

7. The method of claim 1, wherein each of the first axis and the third axis is a Y-axis, and each of the second axis and the fourth axis is an X-axis.

8. A method comprising:

displaying a first graphical representation of a first set of attributes of a data set, the first graphical representation comprising graphical elements displayed in accordance with a first set of classifications defined on the basis of ranges of attribute values of the first set of attributes;

displaying a second graphical representation of a second set of attributes of the data set, the second graphical representation comprising graphical elements displayed in accordance with a second set of classifications defined on the basis of ranges of attribute values of the second set of attributes, wherein the ranges of attribute values of the second set of attributes is different than the ranges of values of the first set of attributes;

receiving an indication to display a third graphical representation indicative of a correlation between the first and the second attributes of the data set; and displaying the third graphical representation, the third graphical representation comprising a combination display of the first set and the second set of attributes with respect to the first set of classifications, the third graphical representation providing an indication of one or more correlations between the first and the second attributes with respect to the first set of classifications.

9. The method of claim 8, further comprising assigning at least one of a color or a shade to each of the classifications.

10. The method of claim 8, wherein the first graphical representation comprises one of a histogram, a scatter plot, or a pie chart.

11. The method of claim 8, further comprising:

receiving cursor input comprising a selection of an area of the first graphical representation, the area encompassing a subset of graphical elements; and displaying the third graphical representation using only the one or more graphical elements included in the selection.

12. The method of claim 8, wherein the correlation between the first and the second attributes of the data set is a one-to-many association.

13. The method of claim 8, wherein the correlation between the first and the second attributes of the data set is a one-to-one association.

14. The method of claim 8, wherein the first graphical representation comprises the first set of attributes displayed as a first set of histogram bars, the second graphical representation comprises the second set of attributes displayed as a second set of histogram bars, and the third graphical representation comprises the combination of the first and the second attributes displayed with the first set of histogram bars integrated with the second set of histogram bars.

15. The method of claim 8, wherein the graphical elements of the first graphical representation comprise a first set of histogram bars, the graphical elements of the second graphical representation comprise a second set of histogram bars, and the third graphical representation comprises the first set of histogram bars displayed within the second set of histogram bars with sizes of the first and the second histogram bars indicating the one or more correlations between the first and the second attributes.

16. A system comprising:

at least one computing device;

a data storage component that stores a data set, wherein the data set comprises a plurality of records and each record comprises a first attribute and a second attribute; and a graphical user interface component that:

displays a first graphical representation of the first attributes using graphical elements assigned to a first set of classifications associated with the first attribute, each of the first set of classifications encompassing a first range of attribute values;

displays a second graphical representation of the second attributes using graphical elements assigned to a second set of classifications associated with the second attribute, each of the second set of classifications encompassing a second range of attribute values, wherein the second range is different than the first range;

receives a selection activation via the first graphical representation, wherein the selection activation is indicative of a request to display a third graphical representation; and displays the first and the second attributes in the third graphical representation by using the first set of classifications along a first axis of the third graphical representation to provide an indication of one or more correlations between the first and the second attributes with respect to the first set of classifications.

17. The system of claim 16, further comprising the at least one computing device assigning a color to each of the one or more classifications.

18. The system of claim 16, further comprising the at least one computing device assigning a shading to each of the one or more classifications.

* * * * *